US012090871B2

(12) United States Patent
Wimmer et al.

(10) Patent No.: US 12,090,871 B2
(45) Date of Patent: Sep. 17, 2024

(54) DEVICE FOR OPENING AND CLOSING A CHARGING SOCKET

(71) Applicant: Lisa Draexlmaier GmbH, Vilsbiburg (DE)

(72) Inventors: Stefan Wimmer, Hohenthann (DE); Veronika Gielhammer, Vilsbiburg (DE); Uros Livk, Garching (DE); Benjamin Reil, Pfaffenhofen (DE); Daniel Will, Loiching (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 306 days.

(21) Appl. No.: 17/748,072

(22) Filed: May 19, 2022

(65) Prior Publication Data

US 2022/0371459 A1    Nov. 24, 2022

(30) Foreign Application Priority Data

May 19, 2021   (DE) ..................... 10 2021 112 936.2

(51) Int. Cl.
*H01R 13/447*  (2006.01)
*B60L 53/16*    (2019.01)
*H01R 13/629*   (2006.01)
*H01R 13/639*   (2006.01)

(52) U.S. Cl.
CPC ............ *B60L 53/16* (2019.02); *H01R 13/447* (2013.01); *H01R 13/62955* (2013.01); *H01R 13/639* (2013.01); *H01R 2201/26* (2013.01)

(58) Field of Classification Search
None
See application file for complete search history.

(56) References Cited

FOREIGN PATENT DOCUMENTS

DE    112019002029 T5 *  6/2021  ............ E05F 1/1253
EP         3561963        10/2019
WO    WO-2012171733 A1 * 12/2012  ........... H01R 13/447

OTHER PUBLICATIONS

Office Action issued in corresponding DE Application 102021112936.2, issued Jan. 17, 2022, 5 pages.

* cited by examiner

*Primary Examiner* — Tho D Ta
(74) *Attorney, Agent, or Firm* — Burris Law, PLLC

(57) ABSTRACT

A device for opening and closing a charging socket includes a flap element. Using a shaft, the flap element is movably disposed on a housing of the charging socket, and the shaft comprises a first notch and a second notch. The device further includes a retaining element. The retaining element is mechanically attached to the flap element and comprises a bolt. Using the shaft, the flap element is transferrable from a closed position to an opened position. In the closed position of the flap element, the bolt of the retaining element is latched in the first notch of the shaft. In the opened position of the flap element, the bolt of the retaining element is latched in the second notch of the shaft.

8 Claims, 3 Drawing Sheets

DEVICE FOR OPENING AND CLOSING A CHARGING SOCKET

CROSS-REFERENCE TO RELATED APPLICATIONS

This application claims priority to and the benefit of German Patent Application No. DE 10 2021 112 936.2, filed on May 19, 2021. The disclosures of the above applications are incorporated herein by reference.

FIELD

The present disclosure relates to a device for opening and closing a charging socket.

BACKGROUND

The statements in this section merely provide background information related to the present disclosure and may not constitute prior art.

Purely electrically powered motor vehicles or plug-in hybrid vehicles usually include a charging socket to which a charging plug can be connected for electrically charging a battery of the vehicle. Such charging sockets are usually hidden behind pivotable flaps of the vehicle in order to protect the current-carrying parts that are located in the charging socket from dirt or liquid. As soon as a charging plug is to be inserted into the charging socket, such a flap must be opened. The opening of the flap is usually effected manually using a push button. A closing of the flap is also effected manually.

SUMMARY

This section provides a general summary of the disclosure and is not a comprehensive disclosure of its full scope or all of its features.

The present disclosure is therefore to provide, using the simplest possible constructive means, a simple operation for opening and closing of a flap with a charging socket.

One aspect of the present disclosure relates to a device for the opening and closing of a charging socket comprising a flap element. The flap element is movably disposed, using a shaft, on a housing, and the shaft comprises a first notch and a second notch. The device further includes a retaining element. The retaining element is mechanically attached to the flap element and comprises a bolt, and using the shaft the flap element is transferable from a closed position into an opened position. In the closed position of the flap element, the bolt of the retaining element is latched in the first notch of the shaft, and in the opened position of the flap element, the bolt of the retaining element is latched in the second notch of the shaft.

The charging socket can be disposed on an electrically powered vehicle. The flap element can be a cover of the charging socket. The charging socket serves as charging interface for the electrical charging of a high-voltage battery of the electrically powered vehicle. When the charging socket is closed, the flap element covers electrical components that are disposed in the housing of the charging socket, such as, in one form, contact pins, and thus protects them from splashing water and dirt. For the electrical charging of a battery of the electrically powered vehicle, a charging plug is inserted into the charging socket, wherein the charging plug and the charging socket are electrically connected to each other. For this purpose, it is desirable for the flap element be opened.

Using the shaft, the flap element is movably disposed on the housing of the charging socket. The shaft is a rotating joint axle. The flap element is attached to the shaft using spring elements. In one form, torsion springs can be installed on the shaft as spring elements, and attached to the flap element and to the housing. The flap element can comprise, in one form, a U-shaped mount. In the U-shaped mount, the shaft can be inserted and attached to the flap element in an interference-fit manner. The flap element can comprise a handle. In one form, using the handle, the flap element can be brought into an opened position. By actuating of the handle by an operator, the flap element is manually opened, and the bolt is transferred from the first notch into the second notch.

The shaft comprises a round cross-section. The shaft can comprise a flange. The flange can be formed annular, and be attached to the shaft, and comprise the first notch and the second notch.

The retaining element comprises the bolt. The retaining element further comprises a pin that protrudes into a recess of the flap element. In the closed position of the flap element, the bolt is latched in the first notch of the shaft, and in the opened position of the flap element, the bolt is latched in the second notch of the shaft. By actuating of the handle of the flap element by an operator, the flap element is manually opened, and the bolt is transferred from the first notch into the second notch.

During the transferring of the bolt from the first notch into the second notch, the flap element is correspondingly brought by the pin from the closed position into the opened position.

Due to the round cross-section of the shaft, the transferring of the bolt from the first notch into the second notch can be facilitated.

In one form, the shaft comprises a return element. The return element, in the opened position of the flap element, exerts a return force on the flap element, wherein the flap element is movable by the return force from the opened position into the closed position. The return element can be, in one form, a spring, and additionally serve as an attachment element of the flap element to the shaft. The shaft can also comprise a plurality of return elements.

In one form, the flap element comprises a return element. The return element, in the opened position of the flap element, exerts a return force on the flap element, wherein the flap element is movable by the return force from the opened position into the closed position.

In one form, the retaining element is mechanically attached to the flap element using at least one spring element. The spring element can serve for the attaching of the retaining element to the flap element. In addition, it can serve as a return element.

The retaining element can comprise a projection. The projection is disposed on the retaining element such that with a charging plug inserted into the charging socket, the projection is contacted by the charging plug and is held in its position by the inserted charging plug. As soon as the charging plug is pulled out of the charging socket, the position of the projection is released, and the bolt of the retaining element is transferred by the return force of the return element of the flap element from the second notch into the first notch.

Due to the return element, in one form being mechanically connect the shaft to the flap element, the flap element can be automatically closed again. Due to the projection, no manual closing of the flap element is required, since the closing is effected automatically as soon as the charging plug is pulled out of the charging socket. In one form, the flap element can be manually closed via the handle.

In one form, a damping element is disposed on the flap element, which damping element damps a movement of the flap element during the transferring from the opened position into the closed position. The damping element makes possible a low-noise closing of the flap element.

In one form, the flap element comprises an actuator, which is controllable using a control unit. Using the actuator, the flap element can be opened automatically. The actuator is controllable using the control unit. In one form, the control unit may include a controller configured to control the actuator. In one form, the control unit operably opens the flap element.

In one form, the shaft comprises notches that are disposed distributed about the shaft, and the bolt is latchable into the notches. Due to the notches, further different positions can be realized between the opened position and the closed positions.

In a further form, the shaft is formed as a single piece. In one form, the shaft can be manufactured by an injection-molding process. In the region of the notches, the shaft can have a different cross-section than outside the region of the notches.

Alternatively, the shaft can be formed as multiple parts. In one form, the flange can be attached to the shaft, where flange comprises the first notch and the second notch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
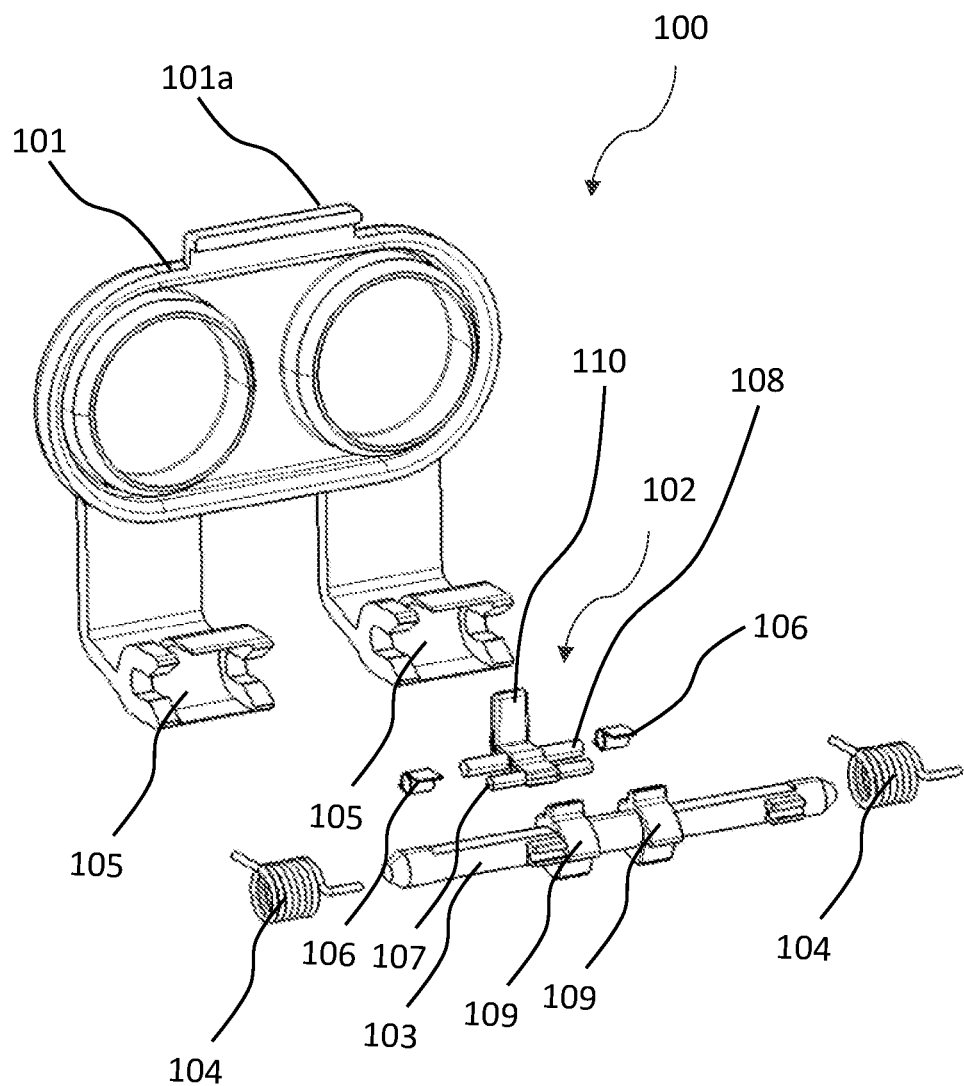
FIG. 1 shows an exploded view of the device, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an exploded view of the device 100 for opening and closing a charging socket. The device comprises a charging socket cover 101 as the flap element. Using a shaft 103, the charging socket cover 101 is disposed in a rotatably supported manner on the charging socket. The shaft 103 is disposed in a recess 105 of the charging socket cover 101. Using torsion springs 104, the charging socket cover 101 is attached to a housing of the charging socket. The torsion springs 104 are attached to the shaft 103. The torsion springs 104 serve as the attachment of the charging socket cover 101 to the housing of the charging socket, and additionally as return elements when the charging socket cover 101 is brought from an opened position into a closed position.

Furthermore, the device 100 comprises a retaining element 102, which is attached to the charging socket cover 101 using torsion springs 106. The torsion springs 106 are attached to the retaining element 102. In a further form, the retaining element 102 can be attached to the charging socket cover 101 via other attachment methods and attachment means. The retaining element 102 comprises a drive pin 108 and a bolt 107. In defined regions, the shaft 103 comprises an enlarged cross-section 109. In one form in the regions in which one or more notches are provided, the shaft 103 comprises an enlarged cross-section 109.

Figure 2:
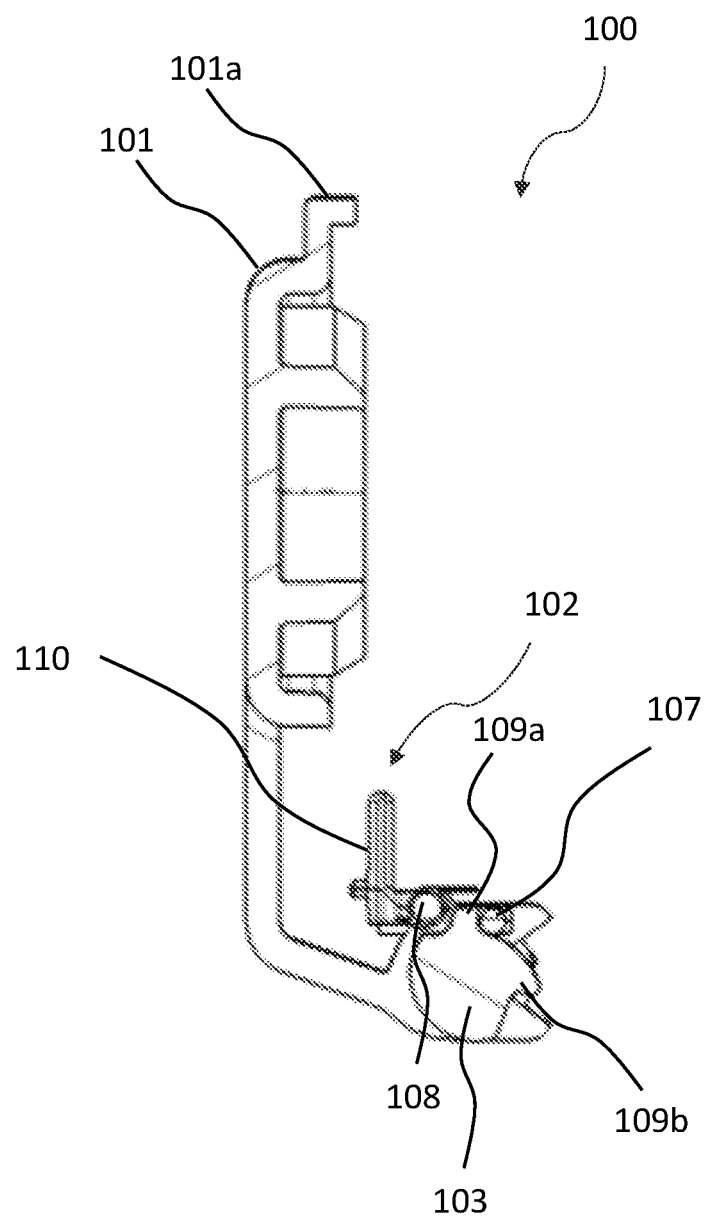
FIG. 2 shows a sectional view of the device in a closed position of a flap element, according to the teachings of the present disclosure.

FIG. 2 shows a sectional view of the device 100 in a closed position of the charging socket cover 101 as the flap element. In the closed position of the charging socket cover 101, the charging socket cover 101 covers a charging socket so that the electronic components of the charging socket are protected from dirt and splashed water. The enlarged cross-section 109 of the shaft 103 comprises a first notch 109a and a second notch 109b. The bolt 107 is latched in the first notch 109a.

Figure 3:
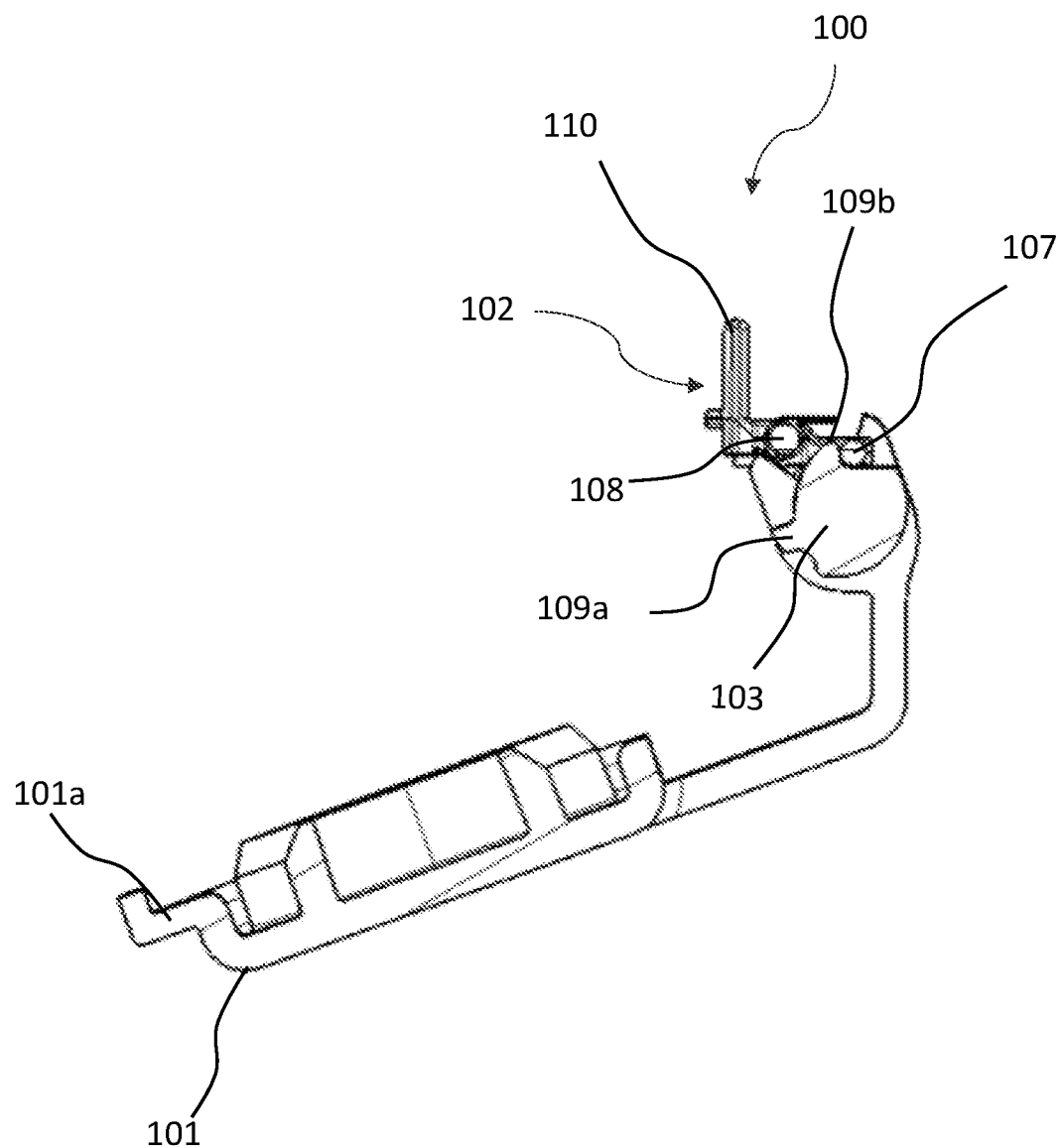
FIG. 3 shows a sectional view of the device in an opened position of the flap element, according to the teachings of the present disclosure.

FIG. 3 shows a sectional view of the device 100 in an opened position of the charging socket cover 101 as the flap element. In the opened position of the charging socket cover 101, a charging plug can be inserted in the charging socket.

The charging socket cover 101 comprises a handle 101a, whereby the charging socket cover 101 can be opened manually.

During the manual opening of the charging socket cover 101, the retaining element 102 is also moved by the drive pin 108, so that the bolt 107 moves out of the first notch 109a. Due to the round cross-section of the shaft 103, the bolt 107 slides from the first notch 109a into the second notch 109b, and latches in the second notch 109b. The torsion springs 104, 106 are tensioned by the opening of the charging socket cover 101. In the opened position, the bolt 107 is latched in the second notch 109b. The charging socket cover 101 is thereby automatically held in the opened position. Due to the round contour of the enlarged cross-section, the bolt 107 can get from the first notch 109a into the second notch 109 in a particularly fast and unhindered manner.

Furthermore, the retaining element 102 comprises a projection 110. The projection 110 is contacted by a charging plug (not shown in FIG. 3) when the charging plug is inserted in the charging socket. In its external shape and dimensioning, the projection 110 is configured such that the charging socket cover 101 is automatically closed by the removal of the charging plug.

In order to close the charging socket cover 101 again, the retaining element 102 can be actuated manually, or actuated by the charging plug, during removal of the charging plug, such that the bolt 107 slides out from the second notch 109b. For this purpose, a slight resistance that arises due to the shape and dimensioning of the second notch 109b must be overcome. In one form, the projection 110 of the retaining element 102 can include a bulge in the region wherein the charging plug contacts the projection 110, so that the resistance can thereby be overcome.

In one form, for closing the charging socket cover 101, the handle 101a can be actuated manually by the handle 101a being lightly pressed toward the charging socket. The resistance can thereby be overcome. The tensioned torsion springs 104, 106 generate a return force by the opening of the charging socket cover 101. Due to the return force and the round cross-section of the shaft 103, after the actuating of the retaining element 102, the bolt 107 slides again automatically out of the second notch 109b, and latches in the first notch 109a. The charging socket cover 101 is thus again in the closed position.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for opening and closing a charging socket, the device comprising:
    a flap element, wherein, using a shaft, the flap element is movably disposed on a housing of the charging socket, and wherein the shaft comprises a first notch and a second notch; and
    a retaining element, wherein the retaining element is mechanically attached to the flap element and comprises a bolt;
    wherein using the shaft, by an operating of the flap element, the flap element is operable to transfer from a closed position to an opened position, and
    wherein in the closed position of the flap element, the bolt of the retaining element is latched in the first notch of the shaft, and in the opened position of the flap element, the bolt of the retaining element is latched in the second notch of the shaft.

2. The device according to claim 1, wherein the shaft comprises a return element operable to, in the opened position of the flap element, exert a return force on the flap element, wherein the flap element is movable by the return force from the opened position to the closed position.

3. The device according to claim 1, wherein the flap element comprises a return element operable to, in the opened position of the flap element, exert a return force on the flap element, wherein the flap element is movable by the return force from the opened position to the closed position.

4. The device according to claim 1, wherein the retaining element is mechanically attached to the flap element using at least one spring element.

5. The device according to claim 1, wherein a damping element is disposed on the flap element, and wherein the damping element is configured to damp a movement of the flap element during the transferring from the opened position to the closed position.

6. The device according to claim 1, wherein the flap element comprises an actuator, wherein the actuator is controllable using a control unit.

7. The device according to claim 1, wherein the shaft comprises additional notches that are disposed distributed about the shaft, and the bolt is operable to latch into the additional notches.

8. The device according to claim 1, wherein the shaft is formed as a single piece.

* * * * *